United States Patent Office 3,303,146
Patented Feb. 7, 1967

3,303,146
LIQUID-FILLED POROUS PLASTIC STRUCTURES
AND METHODS FOR MAKING THEM
Paul Chebiniak, Binghamton, N.Y., assignor to International Business Machines Corporation, New York, N.Y., a corporation of New York
No Drawing. Filed Dec. 30, 1963, Ser. No. 334,562
6 Claims. (Cl. 260—2.5)

The present invention relates to liquid-filled porous, plastic structures and to methods for making them. The invention also relates to methods for making ink-filled, porous plastic printing materials.

Various methods for producing porous plastic structures have long been in use in industry. Some of the typical methods involve the use of blowing agents which are volatilized during the setting of the plastic to form internal cells or bubbles. Other conventional techniques have involved the use of solid particles which are dispersed in the plastic. After the plastic has been set, the particles are then removed by being dissolved, thus leaving voids in the plastic.

Where the porous plastic is a somewhat flexible material, the products of such processes have properties akin to those of natural sponges and they can be used to take up substantial amounts of liquid.

More recently, processes have been developed for producing porous plastic bodies and simultaneously incorporating a liquid in the pores of the product. The present invention relates to a new and more efficient method for producing products of this type whereby a liquid is introduced into the pores of the plastic structure during its formation.

In general, the present invention comprises mixing an aqueous latex of a thermoplastic polymer and a plasticizer to form an aqueous composition containing dispersed droplets of the plasticizer, coagulating the polymer, removing the water and heating the resulting mass until the coagulated particles of the thermoplastic coalesce, i.e., fuse at their points of contact to form a flexible, porous plastic matrix encapsulating the plasticizer.

According to a major embodiment of the invention, the products are employed as printing elements, such as stamp pads, printing rollers, ink-filled type elements, etc. In such cases, it is preferable to add a coloring agent to the aqueous composition. The addition may be made directly to the latex or to the plasticizer. A very satisfactory method is to dissolve an organic dye in the plasticizer.

The plasticizer itself may be added directly to the latex or may first be dispersed or emulsified in an aqueous medium and then mixed in the latex.

Any suitable aqueous thermoplastic polymer latex may be used as the starting material for this invention. The latices formed by the emulsion or suspension polymerization of the corresponding monomers are especially satisfactory. Such latices are ordinarily employed at about 50% solids content, but the amount of water in the latex is not critical.

The following aqueous latices are typical of those which may be used in the present invention: polyethylene, polyvinyl acetate, acrylates, polystyrene, polyvinyl chloride/acetate copolymers, styrene/acrylic copolymers, butyl rubber, styrene/butadiene, vinyltoluene/butadiene, butadiene acrylonitrile, polyvinyl pyrrolidone/ethyl acrylate, vinyl pyrrolidone/styrene, polyvinylidene chloride, polyvinylidene fluoride and polyamides such as nylon.

The plasticizers used in the present invention are a well known class of compounds which are conventionally added to plastics to improve their flexibility or other properties.

The plasticizers referred to in this description include primary plasticizers, secondary plasticizers and mixtures of the two. Primary plasticizers are generally defined as plasticizers which solvate the plastic at elevated temperatures, whereas secondary plasticizers do not solvate the plastic to any substantial degree, even at elevated temperatures.

Whether a primary, secondary or mixture of primary and secondary plasticizers is employed is determined primarily by the nature of the thermoplastic polymer. Some polymers require a primary plasticizer to produce from the coagulated latex a porous plastic structure which is cohesive and flexible. In such cases, for example, with a polyvinyl chloride latex, primary plasticization is required. Therefore, it is preferable to add a mixture of plasticizers, including both primary and secondary types, the latter serving as the principal liquid which is entrapped in the pores of the product.

In other cases, the coagulated latex is capable of being coalesced into a self-supporting, flexible product without the presence of a primary plasticizer. Polyethylene is such a polymer and in this case it may be preferable to employ only a secondary plasticizer.

In any event, the amounts and types of plasticizers used may be readily selected to produce final products having a variety of properties in terms of liquid content, flexibility, strength, etc.

In general, a 50:50 weight ratio of polymer to plasticizer in the final structure produces acceptable products. However, as a stronger, more rigid structure is desired, the amount of polymer may be increased up to about 90% by weight or higher. On the other hand, if a greater liquid content and a more flexible product is sought, the amount of polymer may be reduced to 40% or below. Thus, it will be seen that the amounts of the polymer and plasticizer may be varied over relatively wide ranges without diminishing the advantages of the present method.

The primary plasticizers most frequently used at this time are phthalate, adipate and sebacate esters and aryl phosphate esters. Some suitable primary plasticizers for use in the present invention include dibutyl phthalate, diethyl phthalate, dicyclohexyl phthalate, dimethyl phthalate, diphenyl phthalate, tributyl phosphate, tricresyl phosphate, diamyl phthalate, dibutyl sebacate, dicarbitol phthalate, tributoxyethyl phosphate, 2-pyrrolidone, dioctyl phthalate, dioctyl adipate, dioctyl sebacate, tricresyl phosphate, alkyl aryl phosphate, acetyltributyl citrate and propylene glycol.

Secondary plasticizers include a number of aliphatic and aromatic hydrocarbons. Specific secondary plasticizers useful in this invention include mineral oils, castor oil and oleic acid.

Where the products are to be used as printing elements any combination of dyes, toners or pigments which are compatible with the plasticizer or mixture of plasticizers may be used as the coloring agent.

It will also be apparent that other active ingredients, besides coloring agents, may be incorporated in the liquid in the pores of the plastic. For example, medicines, antiseptics, deodorants and the like may also be introduced during production of the porous structure.

In producing the present structures, the coagulation of the thermoplastic polymer latex may be made in any suitable manner. Many methods for coagulating polymer latices are well known in the art and the specific method selected in the present method is not critical. For example, coagulation may be effected by the addition of an electrolyte, extraction with a solvent, freezing or other technique.

After coagulation, the material is a soft friable mass in considerable excess water. This water may be removed in any suitable manner. It is usually convenient to separate the bulk of the excess water by centrifuging. The coagulated material may then be dried further by heating to evaporate residual water.

After drying, the coagulated composition is heated to fuse the polymer particles at three points of contact, thus forming a porous, coherent plastic structure with the plasticizer in the pores. Where the plasticizer contains a coloring agent, the liquid may be expressed or exuded in response to pressure to serve as an inking or printing element.

The final fusion of the composition is preferably carried out by placing it in a heated mold of desired configuration. In this way, the shape of the product can be controlled as the fusion is taking place.

It is believed that the invention will be more fully understood in the light of the following specific examples.

*Example 1*

A mixture is prepared by combining and thoroughly dispersing about 30 parts by weight of mineral oil in about 70 parts by weight of an aqueous polyethylene latex having a solids content of about 45%.

The resulting aqueous composition is then precipitated and the bulk of the excess water is removed by centrifugal separation.

The partially dried composition is then introduced into a mold of any desired configuration, and is heated at about 260° F. for a few minutes until the polymer particles are fused into a coherent porous mass. The heating first drives off the remaining water and then fuses the resin.

*Example 2*

About 20 parts by weight of dioctyl phthalate and 20 parts by weight of castor oil are thoroughly dispersed in about 60 parts by weight of an aqueous polyvinyl chloride latex.

The resulting aqueous composition is then coagulated and the bulk of the excess water is removed by centrifugal separation.

The coagulated material is then further dried by heating to evaporate the residual water. Then the composition is placed in a mold and heated at about 280° F. for a few minutes to fuse the polyvinyl chloride particles at their points of contact to form a porous plastic mass having droplets of castor oil in the pores.

*Example 3*

The method of Example 1 is repeated, but a Flushed Alkali Blue coloring agent is added to the mineral oil before mixing with the latex.

*Example 4*

The method of Example 2 is repeated, but a black dye is dissolved in the castor oil before mixing with the latex.

The above examples all produce coherent, porous plastic bodies which exude a liquid under impact.

In Example 1, the plasticizer is principally a secondary plasticizer for the polyethylene and serves as the entrapped liquid in which coloring agents or other active additives may be dissolved or dispersed. In Example 2, the plasticizer is a combination of primary and secondary plasticizers for the polyvinyl chloride. The dioctyl phthalate solvates the plastic during fusion and imparts flexibility while the secondary plasticizer, the castor oil, constitutes the liquid inclusions in the pores of the product which may serve as the vehicle for the coloring agent or other materials which may be added.

It will be apparent from the examples that various amounts and types of polymer latices, plasticizers and other additives may be employed in preparing the materials of this invention. However, it will also be clear to those skilled in the art that these and other modifications may be made in the present methods without departing from the spirit or scope of the invention as expressed in the following claims.

What is claimed is:
1. A method for producing ink-filled porous plastic printing structures comprising:
    (a) mixing an aqueous thermoplastic polymer latex and a secondary plasticizer containing a coloring agent,
    (b) coagulating said latex and secondary plasticizer containing said coloring agent,
    (c) removing the water from said coagulated material by first centrifuging and then drying the centrifuged product, and finally,
    (d) heating for only a time sufficient to fuse the thermoplastic polymer to form a porous structure having at least some of said secondary plasticizer containing the coloring agent in the pores capable of being exuded in response to pressure.
2. The method of claim 1 where the polymer is polyethylene.
3. The method of claim 1 where the polymer is polyvinyl chloride.
4. The method of claim 1 further comprising the step of molding said polymer as it is being fused.
5. The method of claim 1 wherein there is additionally admixed a primary plasticizer.
6. The method of claim 1 wherein the secondary plasticizer is selected from the group consisting of mineral oils, castor oil and oleic acid.

References Cited by the Examiner

UNITED STATES PATENTS

| | | | |
|---|---|---|---|
| 2,373,347 | 4/1945 | Schoenfeld | 260—29.6 |
| 3,141,407 | 7/1964 | Leeds | 260—2.5 |
| 3,236,788 | 2/1966 | Smith-Johannsen | 260—2.5 |

OTHER REFERENCES

Perry: Chemical Engineering Handbook, 3rd ed., 1950, McGraw-Hill, pp. 994–999.

MURRAY TILLMAN, *Primary Examiner.*

SAMUEL H. BLECH, *Examiner.*

N. F. OBLON, *Assistant Examiner.*